United States Patent [19]

Blazey

[11] Patent Number: 5,774,236

[45] Date of Patent: Jun. 30, 1998

[54] MULTI-RESOLUTION HALFTONE TILIER

[75] Inventor: Richard N. Blazey, Penfield, N.Y.

[73] Assignee: Eastman Kodak Company, Rochester, N.Y.

[21] Appl. No.: 574,757

[22] Filed: Dec. 20, 1995

[51] Int. Cl.$^6$ .................................................. H04N 1/40
[52] U.S. Cl. ........................ 358/459; 358/429; 358/298; 358/534
[58] Field of Search .................................... 358/459, 458, 358/456, 447, 298, 534, 536, 429

[56] References Cited

U.S. PATENT DOCUMENTS

| | | | |
|---|---|---|---|
| 5,260,807 | 11/1993 | Tai | 358/456 |
| 5,323,245 | 6/1994 | Rylander | 358/536 |
| 5,341,226 | 8/1994 | Shiau | 358/518 |
| 5,394,252 | 2/1995 | Holladay et al. | 358/533 |
| 5,471,543 | 11/1995 | Ng et al. | 382/173 |
| 5,489,991 | 2/1996 | McMurray | 358/456 |

*Primary Examiner*—Edward L. Coles, Sr.
*Assistant Examiner*—Madeleine AV Nguyen
*Attorney, Agent, or Firm*—James D. Leimbach

[57] ABSTRACT

A digital halftoning device for converting digitized contoned image data representing an input image into a halftoned image to be displayed in a visually discernible manner comprising: dividing a digitized contoned image data into a plurality of contoned macrocells at predetermined, integrally spaced locations; determining the optical density of each of the macrocells; converting the contoned macropixels to their halftoned representation, including: comparing the optical density of the macrocells against a predetermined threshold; and suppressing chosen macropixels on integer centers in regions of the image where the threshold code value is exceeded; converting the macropixel pattern into a micropixel image pattern; and outputting the micropixel image pattern to be displayed in a visually discernible manner. The result is the creation of a superpixel in areas of high optical density to create a greater number of gray levels at the expense of spatial resolution.

16 Claims, 5 Drawing Sheets

MULTI-RESOLUTION HALFTONE TILIER

FIELD OF THE INVENTION

The invention relates generally to the field of digital halftoning, and in particular to representing images having high optical densities with halftone images employing multiple resolutions.

BACKGROUND OF THE INVENTION

A problem that exists in halftone imaging is that there is a tradeoff between the number of addressable gray levels (contrast resolution) and the image sharpness (spatial resolution).

A halftone screener of the tiling type creates images by arranging halftone dots in a repeating regular pattern, similar to laying tiles on a floor. Each tile contains a halftone dot whose black area coverage will produce an effective density when viewed with the naked eye.

If a tile is divided into N equal area micropixels, the maximum number of gray levels possible in a binary halftone (2 halftone states) is equal to N+1. Given that there is a practical limit to how small one can make a micropixel, the only remaining way to increase N is to increase the area of the tile. However, increasing the area of the tile reduces the spacial resolution that the screener is capable of reproducing.

In halftone imaging, problems exist in images having high optical densities. The spacing of printed density levels becomes sparse and densities in the source image cannot be reproduced accurately, leading to the production of image artifacts such as contours. This problem has typically been solved in the case of digital halftones by using many tiny micropixels to make up the halftone dot or macropixel. However, this strategy is limited by the degree to which very small, very closely spaced micropixels can be produced. Therefore, a problem in the halftone imaging is that there is a tradeoff between the number of addressable gray levels (contrast resolution) and the image sharpness (spatial resolution).

Raster image processing algorithms which convert digital continuous tone images to digital halftones fall into at least two families, tiliers and samplers. Within these families there are subcategories such as dither dot, cluster dot, error diffusion, etc. Tiliers have only 1 screen pattern, usually oriented at zero or 90 degrees to the viewing direction. Sampling screeners may have several different screens, particularly in color systems and the screens are at different angles to the viewing direction and to each other. Many of the prior art references refer to screeners in the sampling family. Many of them are involved with cures for the problem of image Moire, which does not occur in tiling screeners.

As can be seen from the foregoing description, there remains a need in the art for a halftone imager that can more adequately represent areas of high optical densities.

SUMMARY OF THE INVENTION

The present invention is directed to overcoming one or more of the problems set forth above. At high optical densities, loss of image sharpness (resolution) is less visible to the human eye. Thus one way to increase the number of gray levels in a halftone imaging system is to have a lower resolution in areas having high optical densities than those areas having optical densities below a predetermined threshold. The tiling screener of the present invention converts a digitized continuous tone image to a digital halftone image where the resolution in areas having high optical densities above a threshold $D_{th}$, where the sharpness loss would not be noticeable, is reduced in order to increase the number of gray levels.

Briefly summarized, according to one aspect of the present invention, a method for generating a digital halftone images comprises providing a digitized version of an analog image; dividing the digitized image into a series of macropixel elements; representing, separately, the light and dark area of the macropixel; generating reference coordinates that represent a center of a macropixel; determining a difference value that represents the difference between macropixel centers; and adjusting the difference as a function of density as determined by the contone value of the macropixel The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The multiresolution halftone tilier balances the screening process so that more gray levels are available at high densities where they are needed, without using exceedingly small micropixels to get the required area coverage. Large macropixels are used where the loss of resolution will not be noticeable and small macropixels are used at low optical densities where high resolution is needed and there is no shortage of available gray levels. This should allow the construction of dry laser printers for medical images with less precise and costly optical systems and mechanical systems that would be otherwise needed since larger, less precisely controlled optical beams can be used.

DETAILED DESCRIPTION OF THE INVENTION

It is been discovered, within the art of digital halftoning, that areas having high optical densities can be represented with a lower resolution. At high optical densities, loss of image sharpness (resolution) is less visible to the human eye. Thus one way to increase the number of gray levels in a halftone imaging system is to have a lower resolution in areas having high optical densities than those areas having optical densities below a predetermined threshold.

Figure 1:
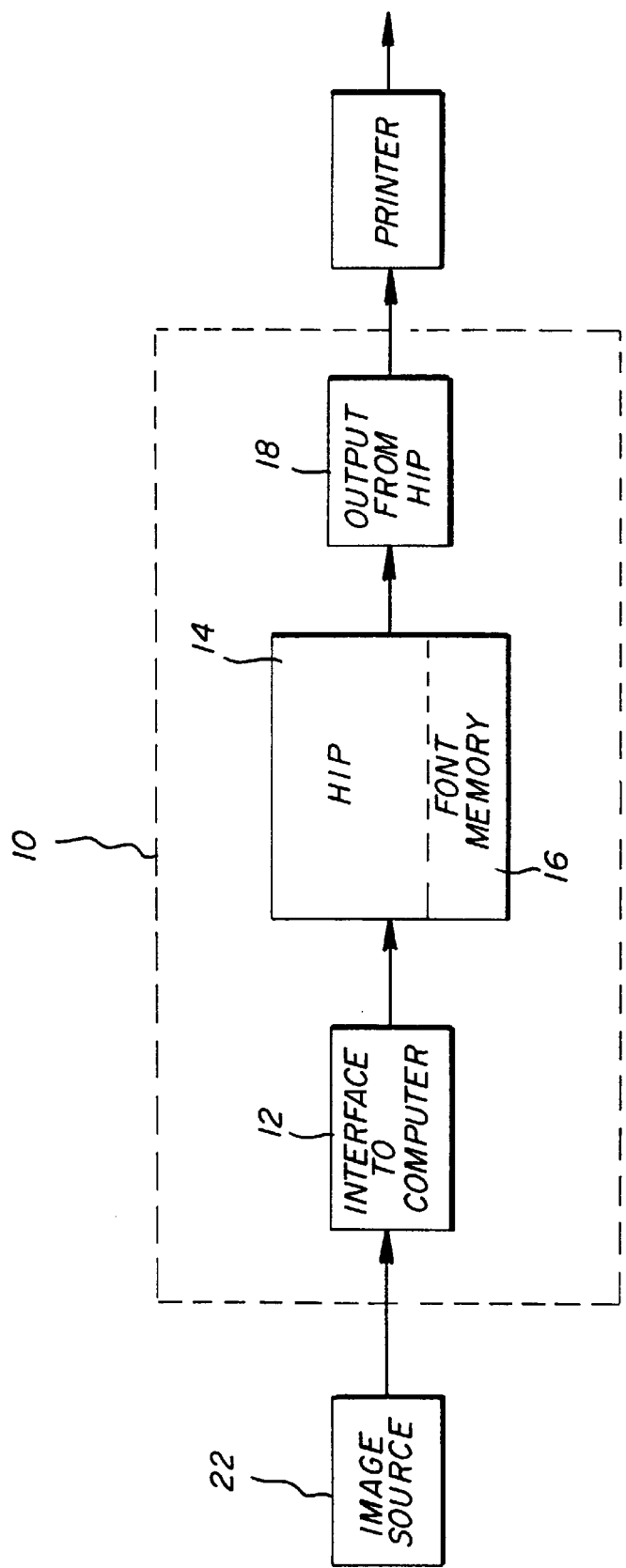
FIG. 1 is a block diagram of a system as envisioned by the preferred embodiment of the present invention.

Referring to FIG. 1, which is a system block diagram as envisioned by the present invention. Computer 10 has an interface 12 with a Halftone Image Processor 14 (HIP). In the preferred embodiment, image source 22 is an X-ray device that is capable of generating a digital image to be used by HIP 14. In this type of embodiment, interface 12 is a workstation interface. The preferred interface would place the HIP 14 on a PCI bus with an IBM compatible computer. The HIP within the preferred embodiment is based on Application Specific Integrated Circuits (ASICs), however, it is also envisioned that the algorithms run by the HIP 14 could be done on a general purpose computer. Placing the processing functions of the HIP within hardware results in a faster system. The HIP 14 is capable of performing halftone image algorithms upon image data that is received from interface 12. The image data received is a digitized version of a contone image received from image source 22. The computer 10 takes the contone image data and divides it into a series of elements that each have a code value which indicates the density of that macropixel. In the preferred embodiment, the image source 10 is a conventional X-ray device capable of creating the digital contone image having macropixel elements with their associated code values. This digital contone image is received by the interface 12 which performs page make up interface, and makes up page and general processing. It is also envisioned that an analog image could be generated from an image source 12, in which event the interface 12 would also have to perform the aforementioned functions of creating a digital contone image having macropixel elements with their associated code values.

The HIP 14 performs the tiling screener function of the present invention by converting the digitized continuous tone image to a digital halftone image wherein the resolution in areas having high optical densities above a threshold $D_{th}$, (where the sharpness loss would not be noticeable) is reduced in order to increase the number of gray levels. The problems associated in areas having high optical, densities and the tradeoffs that occur between the number of addressable gray levels (contrast resolution) and the image sharpness (spatial resolution) are solved by the present inventions provision of increased gray areas in the areas of higher optical density.

Figure 2:
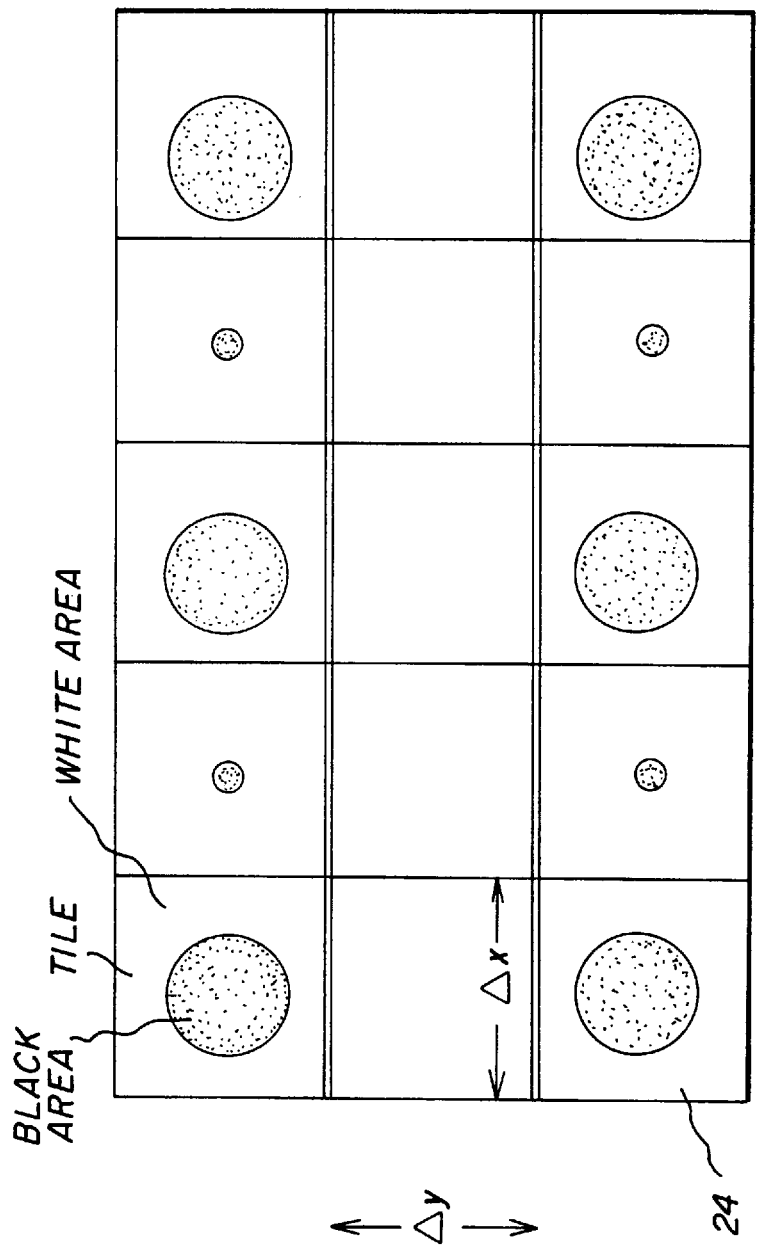
FIG. 2 is diagram illustrating macrocells.
Figure 3:
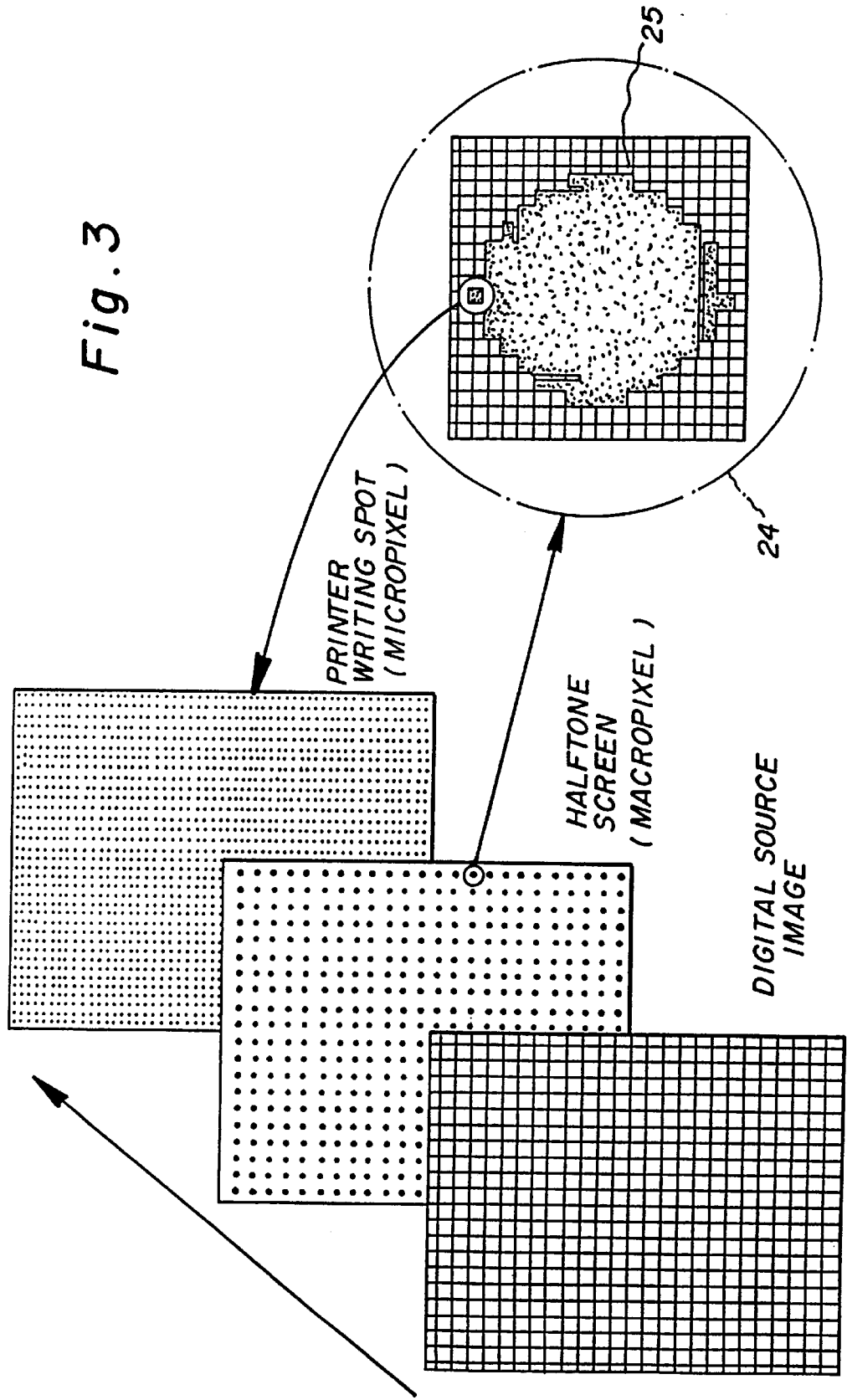
FIG. 3 is a diagram showing a digital halftone macropixel that comprises many micropixels in relation to a digital source image.

Referring to FIG. 2 in conjunction with FIG. 3, consider a halftone screener which "tiles" images" by arranging macrocells 24 with halftone dots 26 in a repeating regular pattern like a tiled floor. Each macrocell 24 contains a halftone dot 26 whose black area coverage that will produce an effective density when viewed at a distance. This is illustrated by FIG. 2 with $\Delta x$ and $\Delta y$ representing the horizontal and vertical spacing of the macropixels. The effective density being given by the Murray-Davies equation as shown in Equation 1 below.

$$D_i = D_{min} - \log_{10}(1 - a_i(1 - 10^{-(Dmax-Dmin)})) \quad \text{Equation 1}$$

where $D_{max}$ and $D_{min}$, are the maximum and minimum densities in the tile.

Referring to FIG. 3, if a macrocell 24 is divided into N equal area micropixels 25, the maximum number of gray levels possible in a binary halftone is then equal to N+1. Given that there is a limit to how small one make a micropixel, the only way to increase the area the number of gray levels is to increase the area of the tile. However, increasing the area of the tile reduces the spatial resolution that the screener is capable of reproducing. The maximum unambiguous spatial frequency (Nyquist frequency) is illustrated in Equations 2a and 2b.

$$f_{nx} = \tfrac{1}{2}\Delta x \quad \text{Equation 2a}$$

$$f_{ny} = \tfrac{1}{2}\Delta y \quad \text{Equation 2b}$$

where $\Delta x$ and $\Delta y$ are, respectively, the x and y dimensions of the macropixel having an area, A, as indicated by Equation 3 below.

$$A = \Delta x \Delta y \quad \text{Equation 3}$$

The relationship shown by Equations 2 and 3 is illustrated in FIG. 3.

The following is a brief mathematical representation of the algorithm of the invention. From the well known Murray-Davies halftoning equation, a formula for the area coverage, $a_c$, of a halftone macropixel cell 10 (which is one tile in the invention) can be derived. The area coverage is the fraction of the macropixel 10 which is black. In Equation 4, D is the desired optical density, $D_s$ is the density of the film support without any light absorber, and $D_d$ is the density of the unexposed light absorbing layer.

$$a_c = \frac{(1 - 10^{-(D-D_s)})}{(1 - 10^{-D_d})} \quad \text{Equation 4}$$

The fraction of the macropixel which is white is $1-a_c$. If we build the macropixel out of $N_d$ equal area micropixels we may define a number $n_{dots}$ which is the number of white dots needed to produce a density D by the relationship shown in Equation 5.

$$n_{dots} = (1 - a_c) N_d \quad \text{Equation 5}$$

Typical prior art devices only contain $N_d = N$ micropixels per macropixel. The present invention forms a superpixel containing $N_d = M^2 * N$ micropixels by merging together $M^2$ macropixels. This increases contrast resolution ($M^2$ more micropixels to change) at a cost in spatial resolution (sharpness) due to 1/M fewer macropixels per unit length. Therefore, we make this change at high optical densities where the sensitivity of the eye to detail has decreased to the point that the loss of sharpness is not discernible, i.e. at densities $D > D_{threshold}$.

Figure 4:
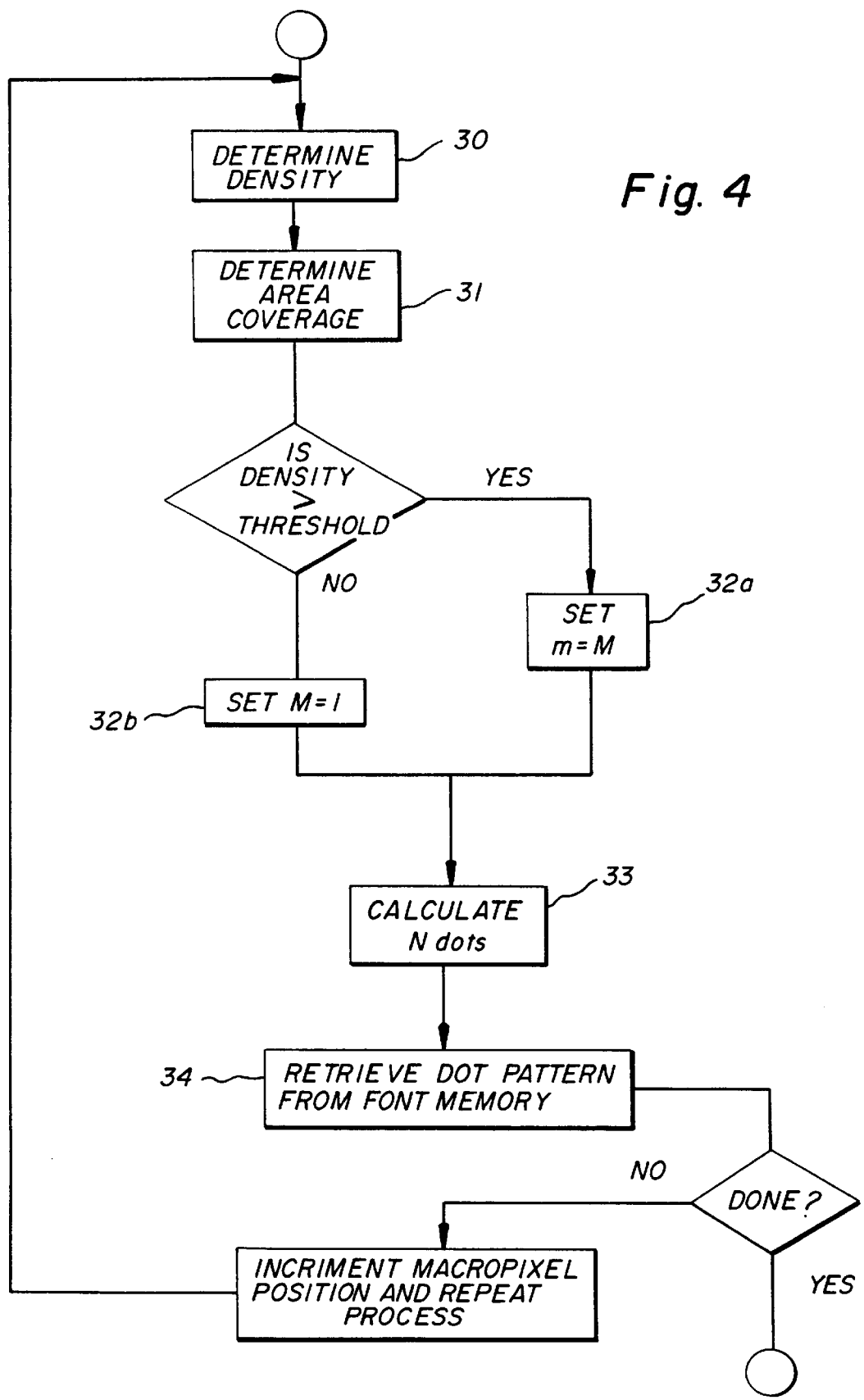
FIG. 4 is a flow chart illustrating the steps used to perform the halftoning algorithm of the present invention.

This process performed by the present invention is illustrated in FIG. 4 which is a flowchart of the steps performed by the system of FIG. 1 as envisioned by the present invention. Initially, Determine Density 30 determines the density of the macropixel from the version of the Murray-Davies discussed for Equation 1. The step of Determine Area Coverage 31 performs the calculation of $a_c$ from the Equation 4 derivation of the Murray-Davies equation as discussed above. The density value determined from the Determine Density 30 step is then compared with the predetermined threshold value for density, $D_{threshold}$. A code density value, where the code value represents a distinct density chosen from a predetermined density code value function, is performed. Set m=M, generally referred to as 32a, is performed if the density value for that macropixel exceeds the $D_{threshold}$ value. Otherwise, if the density value for that macropixel is not exceeded then m=1, generally referred to as 32b, is performed. Following the calculation of m, Calculate $N_{dots}$ 33 is performed. The determination of the value of $N_{dots}$ is used direct the step of Retrieve Dot Pattern From Font Memory 34 to the correct area of font memory to retrieve the dot pattern that will be placed on the output bus and displayed. The Increment Macropixel 35 position is performed and the process is repeated.

Figure 5A:
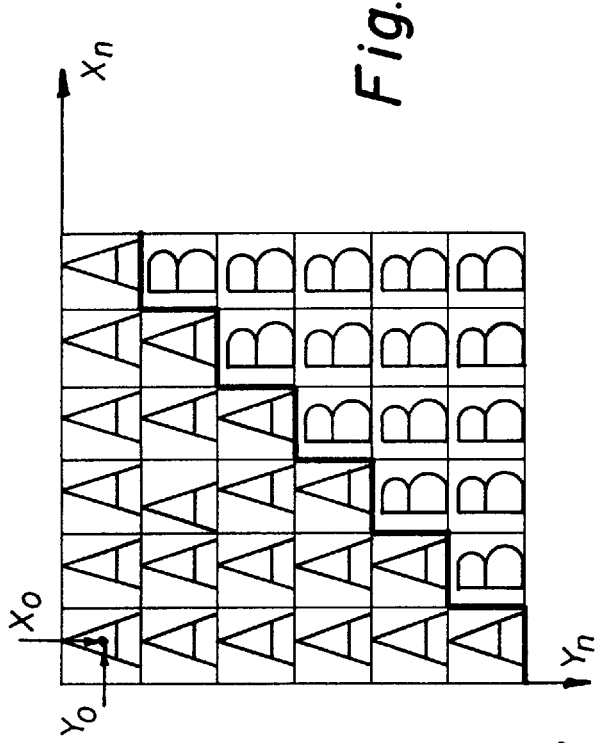
FIG. 5a is an illustration of an analog image to be represented by the halftoned image of the present invention.
Figure 5B:
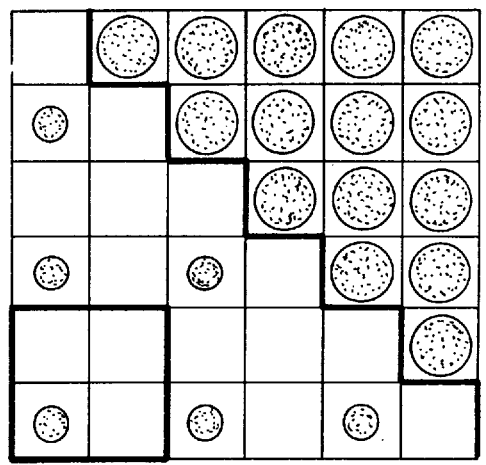
FIG. 5b is an illustration of the digitized version of the analog image of FIG. 1 that is to be represented by the halftoned image of the present invention.
Figure 5C:
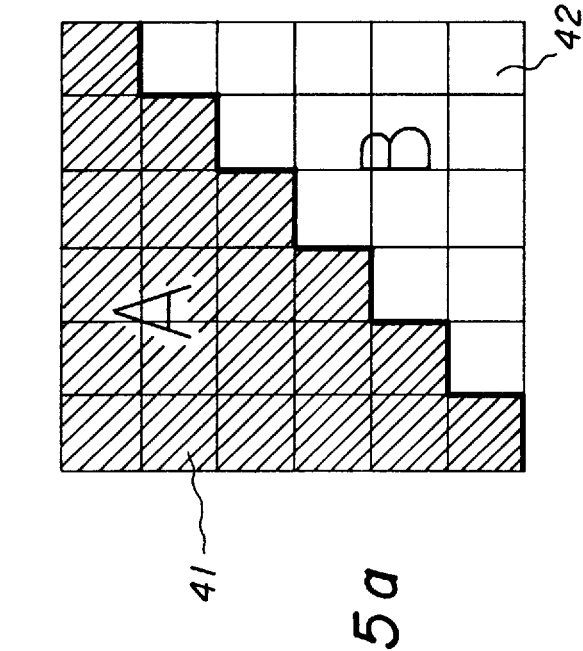
FIG. 5c is an illustration of a prior art halftoned image of the digitized FIG. 6b.
Figure 5D:
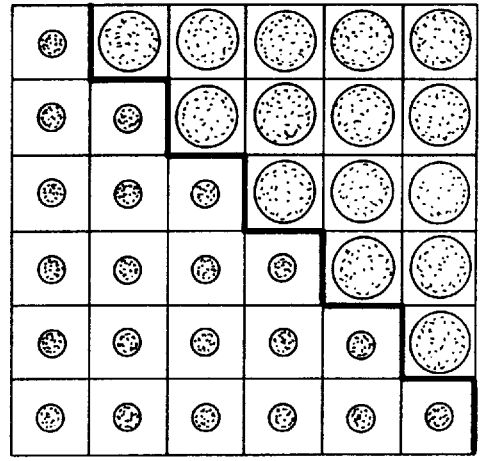
FIG. 5d is an illustration of the halftoned image of the present invention.

Referring to FIG. 5a through FIG. 5d, which are illustrations an analog image in FIG. 5a having a high optical density area 41 having a density greater than $D_{threshold}$ and a low optical density area 42 that is less than $D_{threshold}$. FIG. 5b is an illustration of the digitized version of the analog input image of FIG. 5a with the high optical density area that has exceeded $D_{threshold}$, shown as a plurality of discrete areas, each labeled A, and the area that has not exceeded $D_{threshold}$ shown as a plurality of discrete areas, each labeled B. FIG. 5c shows as prior art halftoned image of FIG. 5b. FIG. 5d is the halftoned output image of FIG. 5b according to the present invention. We may express the formation of this supercell, shown in FIG. 5d, mathematically in the following way. If $x_n$ and $y_n$ are the co-ordinates of the center of the nth macropixel, and macropixels are ordinarily spaced $\Delta$ apart we may express the co-ordinates of the n+1 macropixel by the relationship shown in Equation 10

$$x_{n+1}=x_n+\Delta \text{ and } y_{n+1}=y_n+\Delta \qquad \text{Equation 10}$$

In accordance with the present invention, the spacing relationship is altered in area having a high optical density greater than a threshold value, $D_{threshold}$. Expressed mathematically we change the two previous equations to the relation shown by Equation 11.

$$x_{n+1}=x_n+m^*\Delta \text{ and } y_{n+1}=y_n+m^*\Delta \qquad \text{Equation 11}$$

where m is an integer dependent upon the density.

For values of D equal to or greater than $D_{threshold}$, m is greater than 1 and has a value of M=2 in the case illustrated in the drawings. This would yield a superpixel having $m^2$, or 4, times as many micropixels per pixel. By still increasing the integer amount, M, even larger superpixels are obtainable, yielding still greater amounts of gray levels.

For $D<D_{threshold}$, M is 1.0 and the halftoning proceeds as given by Equation 1.0, retaining spacial resolution in areas having lower optical densities where the spacial resolution is discernible.

The preferred embodiment discussed hereinabove, employs a digitizer to the analog image data seen in FIG. 5b. Once the digitized data is divided into macrocells, a comparison is then performed on each macrocell to determine if that macrocell exceeds the predetermined threshold. This digital approach is preferred because of the relative sophistication in modern digital electronics. Moreover, once digitized, the macrocells have been clearly identified and no additional analog circuitry is required for the task of identifying each macrocell with its respective threshold levels.

However, the present invention envisions that the analog image shown in FIG. 5a having higher optical density areas 41 and lower optical density areas 42, may have the relative optical density of these areas determined in various ways. A comparison of the image data may be accomplished using analog devices, at the front end of the system. Here, a comparison may done with the input data to give an indication of whether the image data exceeds a predetermined threshold. The result of this comparison is fed into a digital computer. It should be understood by those skilled in the art that care must be taken to insure that the results of this comparison is fed into the computer synchronized with the image data that it represents a comparison for. Additionally, accuracy in analog systems can not be as easily controlled as digital systems. Therefore, using an analog comparison is not preferred though certainly possible as those skilled in the art are aware.

The invention has been described with reference to a preferred embodiment. However, it will be appreciated that variations and modifications can be effected by a person of ordinary skill in the art without departing from the scope of the invention.

Parts list

| Parts List: | |
|---|---|
| 10 | computer |
| 12 | input |
| 14 | halftoning image processor |
| 16 | font memory |
| 18 | output |
| 22 | image source |
| 24 | Macropixel |
| 25 | micropixel |
| 26 | Halftone dot |
| 30 | Determine Density Step |
| 31 | Determine area coverage, $a_c$ |
| 32a | Set m = M |
| 32b | Set m = 1 |
| 33 | Calculate $N_{dots} = m^2 N$ |
| 34 | place dot pattern |
| 35 | Increment position |
| 41 | high optical density |
| 42 | low optical density |

I claim:

1. A method for generating digital halftone images comprising the steps of:
    providing a computational element capable of performing halftoning algorithms;
    inputting a digitized version of a continuous toned image into the computational element;
    dividing the digitized image into a series of continuous tone macropixels;
    determining a density for each macropixel;
    converting the series of continuous tone macropixels into a corresponding series of half toned macropixels having one halftone macropixel for each continuous tone macropixel, where each halftone macropixel is made up of N micropixels;
    selecting a macropixel pattern depending upon an integer function of the macropixel location when the density designated by the digitized continuous tone macropixel exceeds a predetermined threshold;
    converting each of the macropixel patterns to a corresponding micropixel pattern; and
    transmitting the converted micropixel patterns to an output device to be display in a visually discernible manner.

2. The method of claim 1 wherein the converting step further comprises the step of placing the macropixel into different groupings of micropixels when the density exceeds a predetermined threshold.

3. The method of claim 1 wherein the dividing and determining steps further comprise representing the continuous tone macropixels by a code value where the code value represents a distinct density chosen from a predetermined density code value function.

4. The method of claim 3 wherein the selecting step further comprises selecting the macropixel pattern as a function of the code value by choosing a given pattern upon determining that the code value of the macropixel location exceeds the predetermined threshold.

5. The method of claim 1 wherein the selecting step further comprises the step of suppressing selected macropixels on integer centers in regions of the image where the predetermined threshold is exceeded.

6. The method of claim 1 further comprising the step of merging macrocells having predetermined densities for adjusting relative spacing of adjacent macrocells where the predetermined density exceeds the predetermined threshold.

7. The method of claim 6 further comprising the step of generating coordinates, $X_n$, $Y_n$, that represent a center of each macropixel.

8. The method of claim 7 wherein the merging step further comprises adjusting relative spacing from, $x_{n+1}=x_n+\Delta$ and $y_{n+1}=y_n+\Delta$, if $x_n$ and $y_n$ are the coordinates of the center of the nth macropixel, and macropixels are ordinarily spaced $\Delta$ apart, to $x_{n+1}=x_n+m^*\Delta$ and $y_{n+1}=y_n=m^*\Delta$, where m is an integer value greater than 1.

9. The method of claim 1 wherein the step of determining the density is accomplished in analog prior to the inputting step.

10. A device for converting a digitized continuous tone image to a digital halftone image comprising:
- a computational element having means for executing digital halftoning algorithms on digitized versions of images;
- means for inputting a digitized version of a contoned image into the computational means;
- means for dividing the contoned image into a plurality of contoned macropixels predetermined, integrally spaced macrocells each having an integer centers $X_n$, $Y_n$;
- means for determining the optical density of each of the macrocells;
- means for converting the contoned macropixels to their halftoned representation including means for suppressing macrocells on the integer centers;
- means for comparing the optical densities of the macrocells against a predetermined threshold; and
- means for converting the halftoned macropixels into a corresponding series of micropixels.

11. The device of claim 10 wherein the means for suppressing further comprises means for merging a plurality of macrocells into a supercell by altering the spacing of the centers of the macrocells by integral numbers.

12. The device of claim 11 wherein the means for merging further comprises means for adjusting the relative spacing of adjacent macrocells centers from, $x_{n+1}=x_n+\Delta$ and $y_{n+1}=y_n+\Delta$, if $X_n$ and $Y_n$ are the co-ordinates of the integer center of any nth macropixel, and macropixels are ordinarily spaced $\Delta$ apart, to $x_{n+1}=X_n+m^*\Delta$ and $y_{n+1}=y_n+m^*\Delta$, where m is an integer value greater than 1.

13. The device of claim 10 wherein the means for converting further comprises means for suppressing selected macropixels on integer centers in regions of the image where the predetermined threshold code value is exceeded.

14. The device of claim 10 wherein the means for determining the optical density further comprise analog means for determining the density.

15. A digital halftoning device for converting digitized contoned image data representing an input image into a halftoned image to be displayed in a visually discernible manner comprising:
- means for dividing digitized contoned image data into a plurality of contoned macrocells at predetermined, integrally spaced locations;
- means for determining the optical density of each of the macrocells;
- means for converting the contoned macropixels to their halftoned representation
- means for comparing the optical density of each of the macrocells against a predetermined threshold;
- means for selecting macropixels based on results obtained from comparing against the predetermined threshold and for suppressing selected macropixels on integer centers in regions of the image where the threshold code value is exceeded;
- means for converting the macropixels into corresponding set of micropixels; and
- means for outputting the micropixel image pattern to be displayed in a visually discernible manner.

16. The device of claim 15 wherein the means for suppressing within the means for converting further comprises means for merging a plurality of macrocells into a supercell by altering the spacing of the integer centers of the macropixels.

* * * * *